3,258,494
CONDENSATIONS

Alexander F. MacLean and Adin L. Stautzenberger, Corpus Christi, Tex., assignors to Celanese Corporation of America, New York, N.Y., a corporation of Delaware
No Drawing. Original application Feb. 20, 1959, Ser. No. 794,519. Divided and this application Apr. 27, 1964, Ser. No. 367,276
10 Claims. (Cl. 260—610)

This application is a division of copending application Serial No. 794,519, filed February 20, 1959, and now abandoned.

This invention relates to reactions of peracetic acid.

Acetyl peroxide is known to react with organic compounds containing abstractable hydrogen to form bimolecular condensation products. Thus when acetyl peroxide is decomposed by heating (e.g., at a temperature of about 75–145° C.) in the presence of such organic compounds the more loosely held hydrogen (e.g., hydrogen in α or β position) is abstracted and two molecules of the organic compound unite according to the equation $$2RH \xrightarrow{-2H} RR$$

For example, two molecules of acetic acid each give up an alpha hydrogen and unite at their alpha carbons to form succinic acid. Other peroxides such as peracetic acid and higher peroxides such as dibenzoyl peroxide and lauryl peroxide are ineffective in this reaction.

It is an object of this invention to provide a new and economical method for carrying out this bimolecular condensation.

Other objects of this invention will be apparent from the following detailed description and claims. In this description and claims all proportions are by weight unless otherwise indicated.

In accordance with one aspect of this invention a bimolecular condensation of an organic compound containing abstractable hydrogen is effected by mixing peracetic acid with said organic compound in the presence of acetic anhydride. Use of peracetic acid in the absence of the acetic anhydride does not effect the desired bimolecular condensation of the organic compound. While the exact mechanism of the reactions involved in our process is not understood, we believe that a reaction of acetic anhydride with the peracetic acid takes place to form acetyl peroxide in situ, and that this acetyl peroxide may be the effective condensing agent.

Peferably a solution of the peracetic acid is fed to a mixture of the organic compound and the acetic anhydride relatively slowly, at a rate such that the molar ratio of peracetic acid to acetic anhydride in the mixture is kept below about 0.01:1, preferably below about 0.001:1. At these molar ratios the peracetic acid is most effective. We believe that such molar ratios favor the formation and further reaction of acetyl peroxide as compared to the simple decomposition of the peracetic acid.

The reaction of the peracetic acid, acetic anhydride and organic compound preferably takes place in the liquid phase. Thus the peracetic acid may be added to a liquid mixture of the acetic anhydride and the organic compound containing abstractable hydrogen. The acetic anhydride not only takes part in the reaction but acts as a solvent for many of said organic compounds. It is desirable that the amount of said organic compound be greater than the amount of acetic anhydride, to reduce competition between the hydrogens of the acetic anhydride and the hydrogens of said compound. If the organic compound is not miscible with the acetic anhydride a mutual solvent, preferably inert, may be used to form a homogeneous mixture. The ratio of the amount of acetic anhydride to the amount of organic compound may be, for example, in the range of about 0.04:1 to 0.02:1, by weight.

The reaction of the peracetic acid, acetic anhydride and organic compound takes place most rapidly at an elevated temperature, for example a temperature in the range of about 80 to 150° C.

In effecting the bimolecular condensation, the peracetic acid is preferably fed to the reaction zone as a solution thereof; for example, as a solution of about 5 to 40% concentration preferably in a solvent relatively inert to bimolecular condensation under the conditions of the reaction, such as acetic acid, acetic anhydride or ethyl acetate or other solvent free of tertiary hydrogens, free of activated hydrogens (e.g., hydrogens on a carbon alpha to an aldehyde group) and free of aliphatic unsaturation. However, if desired a reactive solvent may be used.

The reaction of our invention may be used generally for effecting bimolecular condensation of organic compounds which have extractable hydrogen atoms attached to carbon atoms, and which undergo bimolecular condensation when acetyl peroxide is decomposed in contact therewith. Examples of such compounds with their bimolecular condensation products indicated in parentheses, are: acids, such as acetic acid (succinic acid), isobutyric acid (2,2,3,3-tetramethylsuccinic acid acid), chloroacetic acid (dichlorosuccinic acid); esters, such as methyl chloroacetate (dimethyl α,α-dichlorosuccinate), methyl fluoroacetate (dimethyl α,α-difluorosuccinate), methyl dichloroacetate (dimethyl tetrachlorosuccinate), methyl acetoacetate (dimethyl α,α'-diacetylsuccinate), methyl phenyl acetate (dimethyl α,α'-diphenylsuccinate), methyl p-toluate (1,2-bis-4 carbomethoxyphenyl-ethane), dimethyl succinate (1,2,3,4-tetracarbomethoxybutane); acid halides, such as isobutyryl chloride (tetramethyl succinyl dichloride and by further reaction tetramethyl succinic anhydride); ketones, such as butanone (3,4-dimethyl-2,5-hexanedione), 3-methyl butanone (3,3,4,4-tetramethyl-2,5-hexanedione), 2,4-dimethyl-3-pentanone (2,4,4,5,5,7-hexamethyl-3,6-octanedione), 2,6-dimethyl-4-heptanone (2,9-dimethyl-5,6-diisopropyl-4,7-decanedione), 1 - phenyl propanone (3,5-diphenyl-2,5-hexanedione), 2,4-pentanedione (sym-tetraacetylethane), 3,3 - dimethylbutanone (2,2,7,7 - tetramethyl-3,6 - octanedione), cyclohexanone (2,2'-dioxobicyclohexyl); alkyl benzenes, such as isopropyl benzene (2,3-dimethyl-2,3-diphenylbutane), ethylbenzene (2,3-diphenylbutane), p-methoxy-n-propylbenzene (hexestrol dimethyl ethers); and complex biochemicals such as penicillin and reserpine fractions.

Another aspect of this invention relates to the preparation of acetyl peroxide without immediate further reaction thereof. Here peracetic acid and acetic anhydride are reacted. Preferably the peracetic acid is supplied as a solution thereof and the reaction is conducted at a temperature below the temperature at which acetyl peroxide undergoes appreciable decomposition. While dry acetic acid may be used as the solvent, acetic acid is also a product of the reaction and we have found it necessary to provide a higher proportion of acetic anhydride to effect substantially complete reaction when acetic acid is present in large amounts than is necessary when other solvents are used. Examples of other solvents are ethers such as methylal and dioxane; and esters such as dimethyl phthalate and ethyl acetate. The reaction proceeds most rapidly under substantially anhydrous conditions and in the presence of a strong acid catalyst, such as a cationic-exchange resin having free sulfonic acid groups (e.g., a sulfonated styrene-divinylbenzene copolymer or a sulfonated phenol-formaldehyde resin) or sulfuric acid. The temperature of the reaction may suitably be in the range of about 10 to 50° C. The mole ratio of peracetic acid to acetic anhydride is desirably in the range of about 1:2 to 1:1.1. For safest operation the degree of dilution should be such that the concentration of acetyl peroxide in the product is not above about 50% and the concentration of peracetic acid in the feed is likewise not above about 50%.

The solution of acetyl peroxide thus produced can be concentrated, as by simple distillation or azeotropic distillation of the solvent, preferably under a reduced pressure to keep the temperature below the temperature at which the acetyl peroxide decomposes appreciably (i.e., below 80° C.). Also the acetyl peroxide may be transferred to another solvent, as by distilling off a more volatile solvent in the presence of a less volatile solvent, below the decomposition temperature.

The following examples are given to illustrate this invention further:

Example I

An anhydrous solution containing 76.5 parts by weight of acetic anhydride and 25.2 parts by weight of acetic acid was maintained at a temperature of 90° C. and stirred while 10 parts by weight of an anhydrous 28% solution of peracetic acid in acetic acid were added gradually and continually thereto over a period of 5 hours. The mixture was then evaporated under reduced pressure until there was no odor of acetic acid, the residue being succinic acid. The evaporation removed the anhydride also.

Example II 200 ml. (183 g.) of an anhydrous 30.4 w./v. percent (30.4 g./100 ml.) solution of peracetic acid in acetic acid (obtained by distillation and free of strong acid) was mixed with 124 grams of acetic anhydride and 15 grams of a sulfonated copolymer of styrene and divinylbenzene (Amberlite IR 120, acid form, from which the water had been removed by previous treatment with 50–50 acetic anhydride-acid solution followed by acetic acid washing and vacuum drying at a temperature of 25° C.). An exothermic reaction ensued, the reaction temperature being controlled at about 25° C. After 20 hours the reaction was substantially complete, over 98% of the peracetic acid having been reacted. The product, after removal of the resin catalyst, was a solution of acetyl peroxide in acetic acid containing unreacted acetic anhydride.

Example III

Peracetic acid and acetic anhydride were mixed (a) in 1:1 molar ratio and (b) in 1:1.1 molar ratio. The peracetic acid was supplied as an anhydrous 25.2 w./v. percent solution of peracetic acid in methylal (containing 2.0 w./v. percent of acetic acid). The materials were mixed at ambient temperature and the slow exothermic reaction raised the temperature only slightly. After standing over a weekend, 92% of the peracetic acid had reacted in (a) where the proportions were equimolar; and substantially all the peracetic acid had reacted in (b) where excess acetic anhydride was used.

There was obtained a solution of acetyl peroxide in methylal containing acetic acid.

Example IV

The solution produced by the complete reaction in Example III was mixed with 9/10 its weight of isobutyric acid and distilled at a pressure of 20 mm. Hg absolute on a Vigreux column. The acetic acid and methylal were taken off overhead and a solution of acetyl peroxide in isobutyric acid was recovered from the base of the column, at a temperature of 60° C.

Example V

The solution produced in Example II was distilled under a column at a pressure of 20 mm. Hg absolute to remove part of the acetic acid overhead, using a top temperature of 31° C. and a pot temperature of 44° C. A solution containing 41.6% acetyl peroxide was produced.

Example VI

The solution produced in Example II was mixed with n-heptane and fractionally distilled at a pressure of 80 mm. Hg absolute, taking a heptane-acetic acid azeotrope off overhead. A 44% solution of acetyl peroxide in acetic acid was obtained.

All the above examples were carried out at atmospheric pressure unless otherwise indicated.

It is to be understood that the foregoing detailed description is merely given by way of illustration and that many variations may be made therein without departing from the spirit of our invention.

Having described our invention what we desire to secure by Letters Patent is:

1. A process for the production of acetyl peroxide, which comprises contacting as the sole reactants peracetic acid and acetic anhydride in a mol ratio of from 1:1 to 1:2 in a substantially anhydrous solution consisting essentially of an inert organic solvent; and reacting said peracetic acid and acetic anhydride in the presence of a catalytic amount of a strong acid catalyst at a temperature of from 10° C. to below 80° C., to form said acetyl peroxide.

2. The process of claim 1, wherein said catalyst is selected from the group consisting of cationic exchange resins having free sulfonic acid groups, and sulfuric acid.

3. The process of claim 2, wherein said cationic exchange resin is selected from the group consisting of a sulfonated styrene-divinyl benzene copolymer and a sulfonated phenol-formaldehyde resin.

4. The process of claim 1, wherein said inert organic solvent is selected from the group consisting of acetic acid, methylal, dioxane, dimethyl phthalate, and ethyl acetate.

5. The process of claim 1, wherein said peracetic acid is provided as a solution thereof in an inert organic solvent.

6. A process for the preparation of acetyl peroxide, which comprises contacting as the sole reactants peracetic acid and acetic anhydride in a mol ratio of from 1:2 to 1:1.1 in a substantially anhydrous solution consisting essentially of an inert organic solvent; and reacting said peracetic acid and acetic anhydride in the presence of a catalytic amount of a cationic exchange resin at a temperature from 10° to below 80° C., to form said acetyl peroxide.

7. A process for the preparation of acetyl peroxide, which comprises providing peracetic acid, as a solution in an inert organic solvent, to a reaction zone containing a solution of acetic anhydride in said inert organic solvent, the mol ratio of peracetic acid to acetic anhydride being between 1:1 and 1:2; and reacting said peracetic acid and acetic anhydride, as the sole reactants, in said reaction zone at a temperature of 10° to 50° C. under substantially anhydrous conditions to form acetyl peroxide.

8. The process of claim 7, wherein said inert organic solvent is acetic acid, and said reaction takes place in the presence of a catalytic amount of a cationic exchange resin.

9. The process of claim 7, wherein said inert organic solvent is methylal.

10. The process of claim 7, further including the steps of adding to the reacted mixture a second inert organic solvent having a boiling point higher than the first of said solvents; and removing the lower boiling solvent by distillation below 80° C.

References Cited by the Examiner

FOREIGN PATENTS 403,052   9/1924   Germany.

OTHER REFERENCES

Baeyer et al., Ber. deut. Chem., vol. 33 (1900), page 1581.

LEON ZITVER, *Primary Examiner.*

H. G. MOORE, W. B. LONE, *Assistant Examiners.*